US010126680B1

United States Patent
Dabon et al.

(10) Patent No.: US 10,126,680 B1
(45) Date of Patent: Nov. 13, 2018

(54) COLORANT SAVER FEATURE IN A PRINTER

(71) Applicant: KYOCERA Document Solutions Inc., Osaka (JP)

(72) Inventors: Philip Ver Paloma Dabon, Torrance, CA (US); Neil-Paul Payoyo Bermundo, Glendora, CA (US); Kendrick Esperanza Wong, Torrance, CA (US); Jesus Reyes Beltran, Los Angeles, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/634,791

(22) Filed: Jun. 27, 2017

(51) Int. Cl.
| | |
|---|---|
| *G03G 15/01* | (2006.01) |
| *G03G 15/08* | (2006.01) |
| *H04N 1/00* | (2006.01) |
| *H04N 1/50* | (2006.01) |
| *G06F 3/12* | (2006.01) |
| *G03G 15/00* | (2006.01) |

(52) U.S. Cl.
CPC ..... *G03G 15/0831* (2013.01); *G03G 15/0121* (2013.01); *G03G 15/55* (2013.01); *G06F 3/1204* (2013.01); *G06F 3/1219* (2013.01); *G06F 3/1231* (2013.01); *G06F 3/1296* (2013.01); *H04N 1/00023* (2013.01); *H04N 1/00037* (2013.01); *H04N 1/00082* (2013.01); *H04N 1/50* (2013.01); *H04N 2201/0094* (2013.01)

(58) Field of Classification Search
CPC .......... G03G 15/0121; G03G 15/0831; G03G 15/502; G03G 15/55; G03G 15/556; G06F 3/1204; G06F 3/1219; G06F 3/1231; G06F 3/1296; H04N 1/00023; H04N 1/00037; H04N 1/00082; H04N 1/50; H04N 2201/0094
See application file for complete search history.

(56) References Cited

U.S. PATENT DOCUMENTS

| | | | |
|---|---|---|---|
| 2013/0108296 A1* | 5/2013 | Iinuma | G03G 15/556 399/53 |
| 2013/0235392 A1* | 9/2013 | Iinuma | G03G 15/502 358/1.2 |
| 2016/0223930 A1* | 8/2016 | Harada | G03G 15/556 |
| 2016/0295068 A1* | 10/2016 | Otake | G06F 3/1219 |

* cited by examiner

*Primary Examiner* — Sophia S Chen
(74) *Attorney, Agent, or Firm* — D'Ambrosio & Menon, PLLC; Usha Menon

(57) ABSTRACT

A Toner Saver Feature (TSF) that enables adjustments in toner throughputs thus enhancing a user's control on toner consumption and thereby increasing life of cartridges in printing devices is disclosed. The disclosed TSF is configured to change throughput for each of the plurality of colorants based on at least one Preset Colorant Saver Configuration (Preset) that contains a set of Throughput Rate Reduction (TRR) values for each colorant, and wherein the at least one preset colorant saver configuration is user configurable. TSF enables a user to change the set of TRR values for each of the plurality of colorants individually through a user interface, and save the changed values as one of the Presets. The reduction values get implemented in all modes of printing wherein factory set throughput rates for the current mode get further reduced based on the selected Preset.

20 Claims, 9 Drawing Sheets

COLORANT SAVER FEATURE IN A PRINTER

FIELD OF DISCLOSURE

The present disclosure relates generally to the field of printing devices. In particular, the present disclosure pertains to a system and method to control toner(s) usage while printing depending on their current level with an aim to extending their usability.

BACKGROUND

An MFP (Multi-Function Product/Printer/Peripheral), multi-functional, all-in-one (AIO), or Multi-Function Device (MFD), is an office machine which incorporates functionality of multiple devices in one, so as to have a smaller footprint in a home or small business setting (the SOHO market segment), or to provide centralized document management/distribution/production in a large-office setting. A typical MFP may act as a combination of some or all of the following devices E-mail, Fax, Photocopier, printer, scanner, etc.

MFPs typically print images by depositing one or more colorants such as toner or ink (stocked in the printer in cartridges) on receivers (or imaging substrates), such as paper or other planar media, glass, fabric, metal, or other objects. They operate using toners or inks of different colors such as cyan (C), magenta (M), yellow (Y), black (K), and other colorants. Events of any of these cartridges/toners/inks/colorants getting exhausted are major reasons for interruption in working of MFPs as the printer stops giving prints of satisfactory quality. The printer may also be programmed to stop functioning as soon as any of the cartridges is exhausted. Therefore, economical consumption of cartridges of toners/inks can lead to fewer interruptions besides reducing printing cost on account of cost of cartridges.

As is evident, different documents/images require differing amounts of different toners depending on their composition leading to uneven usage of different toners. The uneven usage or varying rate of toner throughput causes some cartridges to run out faster than others, which leads to unplanned unavailability of printer or MFP equipment due to unavailability of certain toners. This also leads to frequent changing of cartridges for example next cartridge may need to be replaced in a relatively short amount of time after a previous one had just been replaced.

There is, therefore, a need in the art for a MFP that overcomes above stated deficiencies of conventional MFPs. The present invention arose out of the above concerns associated with providing an improved system and method that control toner(s) or ink (s) usage while printing depending on their current level with an aim to extending their usability.

SUMMARY

Aspects of the present disclosure relate to control of usage of colorants such as toners and inks in printing devices such as Multi-Function Printers (MFP) with a view to extend life of cartridges holding the colorants. The present invention provides a Toner Saver Feature (also referred to as colorant saver feature and the two terms used interchangeably hereinafter) for printing devices wherein the colorant saver feature provides additional controls to enable saving of colorants thereby extending life of the cartridges.

In an aspect, the present disclosure provides a printing device that incorporates a colorant saver feature for saving a plurality of colorants to extend usable life of colorant cartridges in the printing device. The colorant saver feature is configured to detect levels of the plurality of colorants. The colorant saver feature further compares the detected levels of the plurality of colorants with a set of threshold levels for each of the respective plurality of colorants, wherein the set of threshold levels for the plurality of colorants is contained within at least one preset colorant saver configuration. Based on the comparison, the colorant saver feature identifies at least one colorant out of the plurality of colorants that has level below the corresponding threshold level, and on detection that at least one colorant has level below the corresponding threshold level, it reduces throughput of each of the plurality of colorant in accordance with a set of throughput rate reduction values for each of the plurality of colorants, wherein the set of throughput rate reduction values is contained within the at least one preset colorant saver configuration. In an aspect, the at least one preset colorant saver configuration is user configurable.

In an aspect, the present disclosure further provides a method for saving a plurality of colorants to extend usable life of colorant cartridges in a printing device, the method comprising steps of: (a) detecting levels of the plurality of colorants; (b) comparing the detected levels of the plurality of colorants with a set of threshold levels for each of the respective plurality of colorants, wherein the set of threshold levels for the plurality of colorants is contained within at least one preset colorant saver configuration; (c) identifying, based on the comparison, at least one colorant out of the plurality of colorants that has level below the corresponding threshold level; and (d) reducing throughput of each of the plurality of colorants, wherein the throughput for each of the plurality of colorants is reduced in accordance with a set of throughput rate reduction values for each of the plurality of colorants, wherein the set of throughput rate reduction values is contained within the at least one preset colorant saver configuration.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
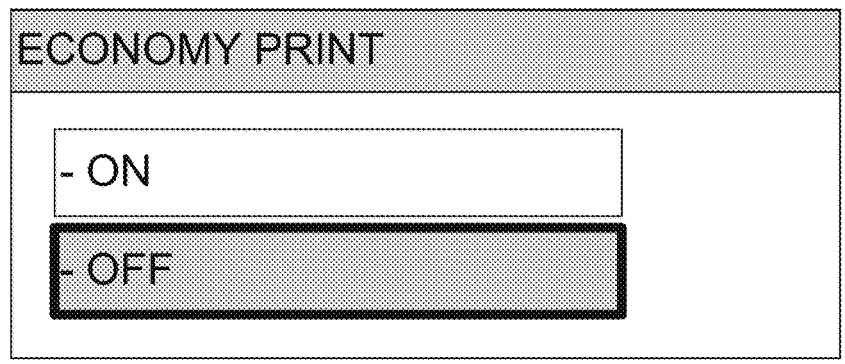
FIG. 1 illustrates a typical display pertaining to economy print mode option that is provided in the related art.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined below, it should be given the broadest definition persons in the pertinent art have given that term as reflected in printed publications and issued patents at the time of filing.

"Colorant" as used in the present disclosure refer to media used in a printing device to generate on surface of a substrate such as paper, an image that the printing device is required to print during printing of print, scanned, copy or fax jobs and other such applications; and includes toners and inks and their cartridges for both laser or inkjet printers or other types of inking technology for the purpose of rendering images or content on a substrate such as paper. It is to be appreciated that terms "Colorant", "Toner" and "ink" "have been used interchangeably in the present disclosure without any limitation. And likewise, terms "Colorant cartridge", "Toner cartridge", "Ink cartridge" and "cartridge" have been used interchangeably.

In the detailed description, the term "Draft mode" in context of current MFPs or printers, "draft mode" referred to in this disclosure includes draft mode and similar toner-saving features, such as fast draft mode or EcoPrint.

"Throughput Rate" or "Toner Throughput Rate" (TTR) refers to amount of colorant or toner or ink material that are produced or emitted from each colorant or toner or ink cartridge (or simply cartridge) during printing. This can also be thought of as the rate of colorant or toner or ink from each cartridge that gets put onto paper during printing. In normal printing mode, the toner throughput may be thought to be 90%. In high quality print mode, it may be 100%. In draft mode, it may be 65% or some other value depending on how it's set at the factory or defined during print head or printer engine design.

"Throughput Rate Reduction" (TRR) refers to reduction that will be applied to Throughput Rate applicable at the current printing mode to reduce the normal colorant throughput rate for cartridges. The resultant rate is "Reduced Throughput Rate" or "Reduced Toner Throughput Rate". To illustrate, for example, in normal printing mode, we said above that the "Toner Throughput Rate is 90%. When reducing this throughput by 10% to effectively save the colorant material from getting output or used for printing, the "Throughput Rate Reduction" (TRR) shall be 10% and the "Reduced Throughput Rate" shall be 80%. In draft mode, where "Toner Throughput Rate" (TTR) would normally be 65% for example, the "Reduced Throughput Rate" would become 55%.

Embodiments explained herein relate to a printing device such as a printer or a Multi-Functional Printer. In particular, they provide a system and method to control toner(s) usage while printing depending on their current level with an aim to extending their usability. In order to achieve this, an embodiment of the present disclosure provides a toner saver feature for multi-function printers to add controls on the management and handling of toners with an aim to extending their usability.

Printing devices such as MFPs available in the art provide various modes for economizing toner consumption. For example, they provide a draft mode or/and a fast draft mode allowing a user to print documents using less toner ink or/and in lesser time than normal. Though documents printed in draft/fast draft mode do not look as clean or as crisp as regular documents, they are satisfactory as test versions to allow the user to see what the print job would look like before printing the final copy, or for quickly printing out versions of his documents using less toner as he refines them. The draft/fast draft modes typically apply a uniform reduction on flow of all toner cartridges, and not on individual toner cartridges. For example, there's no indication that the draft mode applies to just the cyan toner cartridges and not to the other colors (magenta, yellow, and black cartridges).

Figure 2:
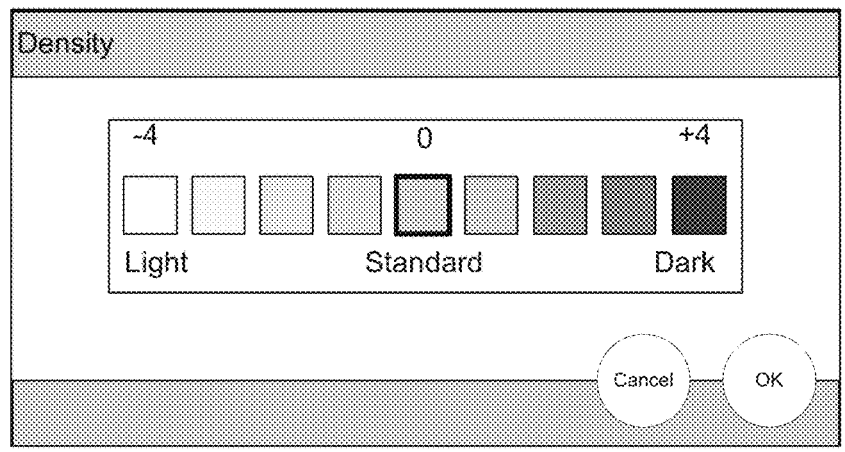
FIG. 2 illustrates a typical display pertaining to default options to control density of toner that is provided in the related art.
Figure 3:
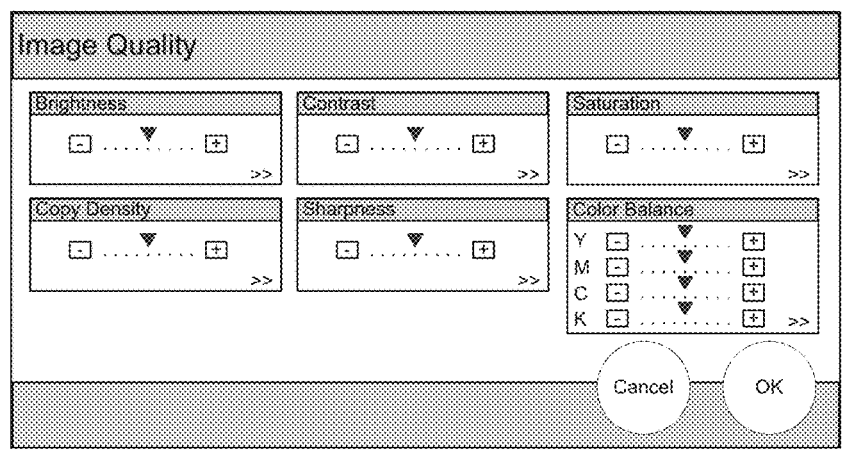
FIG. 3 illustrates a typical display pertaining to additional print quality controls that is provided in the related art.

An example of mode for economizing toner consumption as well as exercising controls to influence print quality in the related art is economy mode as exemplified by FIG. 1. Another mode/control is one that enables a user to exercise his option among factory-set defaults to control density of toner for printouts as shown in FIG. 2. Yet another control/mode provided to enable a user to exercise his options in respect of features such as brightness, contrast color balance etc. among other features is shown in FIG. 3. However, none of these controls/modes indicates amounts of toners being consumed, or provides control for toner consumption at disposal of the user, or allows a user to further influence the quality of printouts.

Therefore, toner or ink cartridges in available MFPs have to be replaced frequently as user is not able to control their consumption resulting in higher cost of printing as also the printers remaining down frequently for change of one or other cartridge. Currently, the life of toner cartridges is extended only when draft mode or other similar modes are consistently and more frequently used as compared to normal or high quality printing modes. Thus, this binds the user for selecting those fixed toner-saving features. In addition, the actual amount of toner that would be saved in draft mode also depends on defaults pre-determined and set at the factory. The draft mode reduces the amount of toner that is put onto paper by some degree, and that setting is constant until the toner cartridges become empty. In this scenario, there is no control to change the usage of toners. While there are other existing settings like fast draft mode that makes draft mode output even lighter, the quality sometimes may not be satisfactory to users. It would be better if there is better control on the print quality based on better management and handling of toner. Further, the current draft modes in MFPs exhibit fixed presets on the combination of all toner cartridges, and not on individual toner cartridges. For example, there is no indication that the draft mode applies to just the cyan toner cartridges and not to the other colors such as magenta, yellow, black cartridges or other additional toners that may be installed or supported in the MFP or printer engines.

Furthermore, for the existing setting to save the toner there is no way for user to further influence the quality of printouts. For example, there may be instances or scenarios where user may want the printout quality to be somewhere in between draft mode and normal mode, i.e., the print has to be not too draft but not normal either. In another example, the user may want quality to be in between fast draft mode and below draft mode quality, i.e., the print is not too light.

The present invention arose out of the above concerns associated with providing an improved system and method that control toner(s) usage while printing depending on their current level with an aim to extending their usability.

Embodiments explained herein relate to control of usage of colorants such as toners and inks in printing devices such as Multi-Function Printers (MFP) with a view to extend life of cartridges holding the colorants/toners/inks. In an embodiment, the present disclosure provides a Toner Saver Feature (also referred to as colorant saver feature and the two terms used interchangeably hereinafter) for printing devices wherein the colorant saver feature provides additional controls to user to enable saving of colorants thereby extending life of the cartridges, wherein the colorant saver feature is configured to change throughput for each of the plurality of colorants in accordance with at least one preset colorant saver configuration.

In an embodiment, Toner Saver Feature (TSF) of the present disclosure stores at least one "Preset Colorant Saver Configuration" (Also referred to as "Preset Toner Saver Configuration" or "Toner Throughput Preset" or "Toner Saver Preset" or simply "Preset" and these terms are used interchangeably hereinafter) and enables selection and implementation of a Preset Colorant Saver Configuration to extend usable life of colorant cartridges in the printing device.

In an embodiment, Preset Colorant Saver Configurations can be factory set or user configured, and can contain at least one set of Throughput Rate Reduction (TRR) values for each of the plurality of colorants. The corresponding set of TRR values gets implemented for each of the plurality of toners when a Preset Colorant Saver Configuration is selected for implementation.

In an embodiment, the disclosed colorant saver feature enables a user to change the set of TRR values for each of the plurality of colorants individually through a user interface in form of a display, and wherein the changed set of TRR values get saved as one of the Preset Colorant Saver Configurations with a time stamp for future use.

In an embodiment, the user interface that enables a user to change the set of TRR values for each of the plurality of colorants can further provide a preview of potential printout to provide a visual guidance to the user.

In an embodiment, the changed throughput for the plurality of colorants gets implemented in all modes of printing such as normal print mode, high quality print mode, draft mode, fast draft mode, or any other mode that changes the throughput for the plurality of colorants; wherein factory set throughput rates for the mode gets further reduced proportionately based on the selected Preset Colorant Saver Configuration.

In an embodiment, the disclosed Toner Saver Feature is configured to enable a user to select a manual mode or automatic mode of implementation of at least one Preset Colorant Saver Configuration, wherein in manual mode user can select any one of the stored Preset Colorant Saver Configurations on which the corresponding set of TRR values gets implemented irrespective of levels of the plurality of colorants.

In an embodiment, in automatic mode implementation of a Preset Colorant Saver Configuration can be based on levels of the plurality of colorants as compared to a set of threshold levels for each of the respective plurality of colorants. In an embodiment, the Preset Colorant Saver Configuration further includes a set of threshold levels for each of the respective plurality of colorants to enable a comparison and decision to apply corresponding set of TRR values.

In an embodiment, for automatic implementation of at least one Preset Colorant Saver Configuration the disclosed Toner Saver Feature can be configured to (a) detect levels of the plurality of colorants; (b) compare the detected levels of the plurality of colorants with a set of threshold levels contained within at least one Preset Colorant Saver Configuration, for each of the respective plurality of colorants, (c) identify, based on the comparison, at least one colorant out of the plurality of colorants that has level below the corresponding threshold level; and (d) reduce, on detection that at least one colorant has level below the corresponding threshold level, throughput of each of the plurality of colorants in accordance with set of TRR values contained within the corresponding Preset Colorant Saver Configuration.

In an embodiment, at least one Preset Colorant Saver Configuration can get implemented in combination of user selection and automatic implementation; wherein the user selection can be for more than one of the at least one preset colorant saver configuration and the automatic selection switches from one of the user selected Preset Colorant Saver Configurations to other as the detected levels of the plurality of colorants undergo change with usage and cross the set of threshold levels.

In an aspect, the disclosed printing device can have one or more non-transitory storage devices configured to store a plurality of Preset Colorant Saver Configurations and having embodied therein one or more routines operable to regulate the usage of plurality of colorants such as toners or inks while printing, and one or more processors coupled to the non-transitory storage devices and operable to execute the one or more routines. The one or more routines can include a level determination module and a throughput adjustment module. The level determination module can determine colorant levels associated with plurality of colorant cartridges utilized while printing. The throughput adjustment module can adjust throughput rates associated with plurality of colorants while printing, wherein the throughput of the plurality of colorants is adjusted automatically and/or manually based on a set of TRR values contained with a selected Preset Colorant Saver Configuration.

In an embodiment, the disclosed Colorant Saver Feature implements a set of TRR values through any or a combination of toner cartridge integrated chip, print head integrated chip or housing, firmware/Software color management component, firmware/Software color conversion component and firmware/Software Page Description Language (PDL) Interpretation module.

In an embodiment, the disclosed device can further include a user interface adapted to display toner levels associated with one or more toner cartridges and enable a user to configure the Colorant Saver Feature. For example the user, using the interface, can change throughput rates for plurality of colorants, preview quality of print with the changed throughput rates and save the changed throughput values as one of the Preset Colorant Saver Configurations for immediate implementation as well as for future references/print jobs. The user interface can also enable selection of one or more pre-stored Preset Colorant Saver Configurations for implementation in manual mode. It can also enable deletion of the pre-stored Preset Colorant Saver Configurations.

In an embodiment, the disclosed Colorant Saver Feature can be configured by sending the at least one Preset Colorant Saver Configuration and preferences to the printing device through any or a combination of a web service, a mobile app, a desktop app, printer driver user interface, or by sending print jobs that contain commands that would set up the colorant saver feature.

In an aspect, the present disclosure further provides a method for saving a plurality of colorants to extend usable life of colorant cartridges in a printing device, the method comprising steps of: (a) detecting levels of the plurality of colorants; (b) comparing the detected levels of the plurality of colorants with a set of threshold levels for each of the respective plurality of colorants, wherein the set of threshold levels for the plurality of colorants is contained within at least one Preset Colorant Saver Configuration; (c) identifying, based on the comparison, at least one colorant out of the plurality of colorants that has level below the corresponding threshold level; and (d) reducing, on detection that at least one colorant has level below the corresponding threshold level, throughput of each of the plurality of colorants, wherein the throughput for each of the plurality of colorants is reduced in accordance with a set of throughput rate reduction values for each of the plurality of colorants, wherein the set of throughput rate reduction values is contained within the corresponding at least Preset Colorant Saver Configuration.

It is to be appreciated that though various embodiments have been explained with reference to use of toners in a Multi-functional printer, the inventive principle of the present disclosure can be applied to any colorant such as ink and toner or any other printing media, and all such applications are well within the scope of the present disclosure without any limitations.

Figure 4:
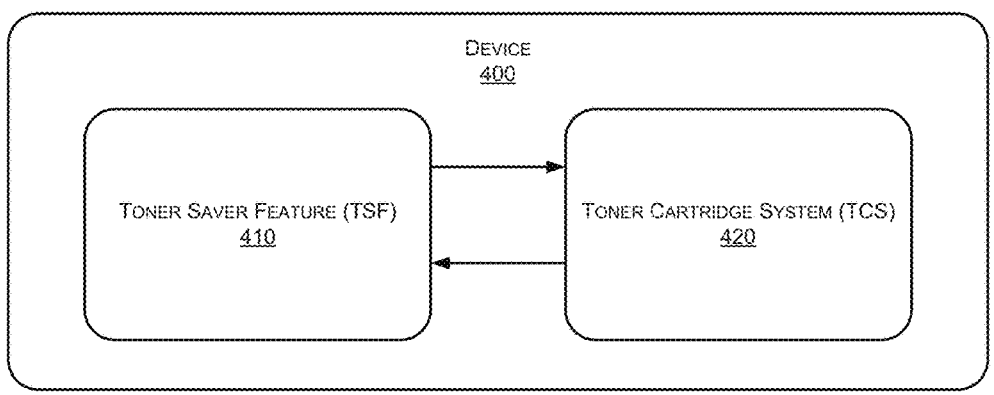
FIG. 4 illustrates an exemplary block diagram indicating interaction of the disclosed Toner Saver Feature (TSF) with other systems for providing additional control for saving toners in accordance with embodiments of the present disclosure.

FIG. 4 illustrates an exemplary block diagram indicating interaction of Colorant Saver Feature/Toner Saver Feature (TSF) with other systems for providing additional control on saving colorants/toners in a printing device such a MFP in accordance with embodiments of the present disclosure. As shown, the TSF 410 can interact with a toner cartridge system 420 of the printing device 400. The toner cartridge system 420 can be block of hardware components that manage or handle the retrieval or extraction of toner or ink for use in printing.

In an embodiment, the disclosed TSF 410 can store a plurality of Preset Colorant/Toner Saver Configurations and implement a selected Preset Colorant/Toner Saver Configuration wherein the selection and implementation of the Preset Colorant/Toner Saver Configurations (also referred to as Toner Saver Presets or Toner Throughput Presets or simply as Presets and all these terms used interchangeably in the disclosure) can result in implementation of a set of throughput rate reduction values stored within the selected Preset Toner/Colorant Saver Configurations. Implementation of the set of throughput rate reduction values results in reduced Toner Throughput Rate (TTR) thereby resulting in reduced consumption of the colorants/toners/inks increasing the life of corresponding cartridges.

In an embodiment, the disclosed TSF 410 can be implemented through any or a combination of toner cartridge integrated chip, print head integrated chip or housing, firmware/Software color management component, firmware/Software color conversion component and firmware/Software Page Description Language (PDL) Interpretation module.

In an aspect, the disclosed TSF 410 can be embodied within one or more non-transitory storage devices configured to store a plurality of Presets and having therein one or more routines operable to regulate the usage of plurality of toners while printing, and one or more processors coupled to the non-transitory storage devices and operable to execute the one or more routines. The one or more routines can include a level determination module and a throughput adjustment module. The level determination module can determine colorant levels associated with plurality of colorant cartridges provided in the printing device. The throughput adjustment module can adjust throughput rates associated with one or more of the plurality of colorants while printing, wherein the throughput of one or more of the plurality of colorants is adjusted automatically and/or manually based on a set of throughput rate reduction values contained in a selected Preset.

In an embodiment, there can be plurality of Preset Toner Saver Configurations/Presets and they can be factory set or can be user configured. Each Preset can contain a set of Throughput Rate Reduction (TRR) values for each toners/colorant. The corresponding set of TRR values get implemented for the plurality of toners/colorants when a Preset is selected for implementation.

In an embodiment, the disclosed TSF 410 enables a user to create/configure a Preset by changing and setting a set of Throughput Rate Reduction values for each of the plurality of colorants individually through a user interface in form of a display. The changed set of TRR values gets saved as one of the Presets.

Figure 5:
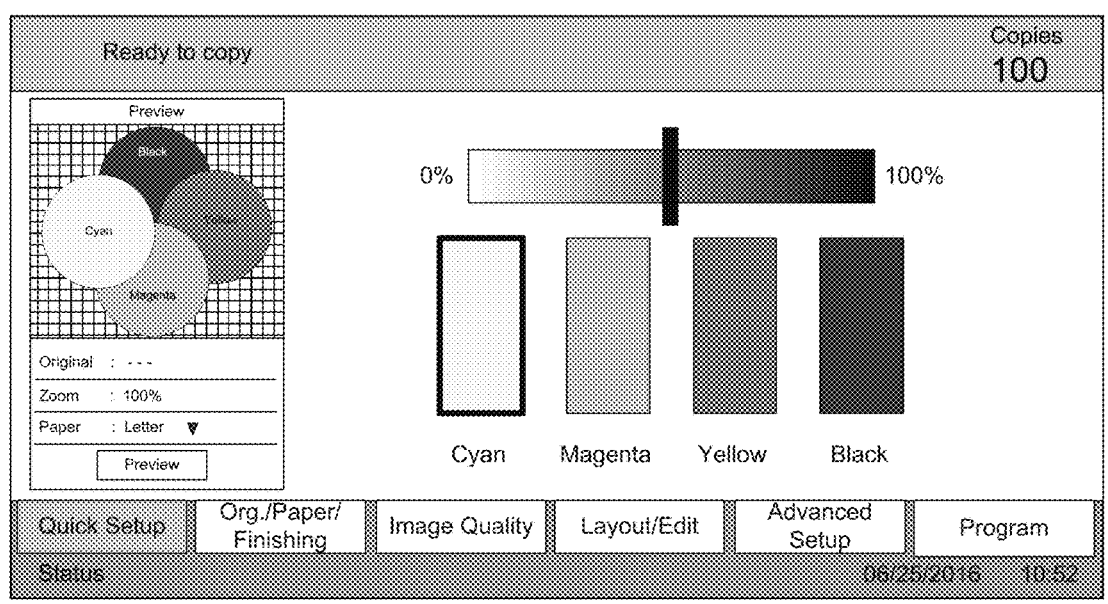
FIG. 5 illustrates an exemplary screenshot of user interface showing main menu for Toner Saver Feature (TSF) in accordance with embodiments of the present disclosure.

FIG. 5 illustrates an exemplary screenshot of user interface showing main menu for Toner Saver Feature (TSF) 410 in accordance with embodiments of the present disclosure. Printer or MFP front panel can show the exemplary main menu as an interface with the TSF and enable user to manage and control the toner throughput with the goal of prolonging life or usability of the toner cartridges. In an embodiment, the front panel provides additional controls to a user to regulate toner throughput for each toner, which are applied irrespective of mode of printing such as normal print mode, high quality print mode, draft mode, fast draft mode, or any other toner-saving modes.

In an embodiment, the user interface can display the level of throughput for each toner cartridge. For example, when the user selects cyan color, the user interface immediately shows the current level of the cyan toner in the associated toner cartridge.

In an embodiment, the user interface can further enable a user to change Toner Throughput Rates for each of the toners independently and individually. For example, when the user selects any particular color and thereafter moves slider along status bar (0% to 100%) he selects a Toner Throughput Rate (TTR) for the corresponding color. For instance, if a user were to set the slider at 80% for Cyan color, 80% of TTR applicable for Cyan color at current printing mode shall be implemented (i.e. a reduction of 20%). The selected values for each of the plurality of colours can get stored a set of throughput rate reduction values and can make one Preset Toner Saver Configuration/Preset. User can implement the selected set of Throughput Rate Reduction values immediately and/or save it as a Preset for future use. Thus, the user interface also provides a mechanism to save the user's preference in this user interface for re-use at a future time.

In an embodiment, when a user adjusts the level of throughput for different toners, effect of the change on potential printout may be shown in a preview to give visual guidance to the user. It would be appreciated that the user interface example shows the ability to adjust the toner throughput for each toner cartridge installed on the printer or MFPs.

Figure 6:
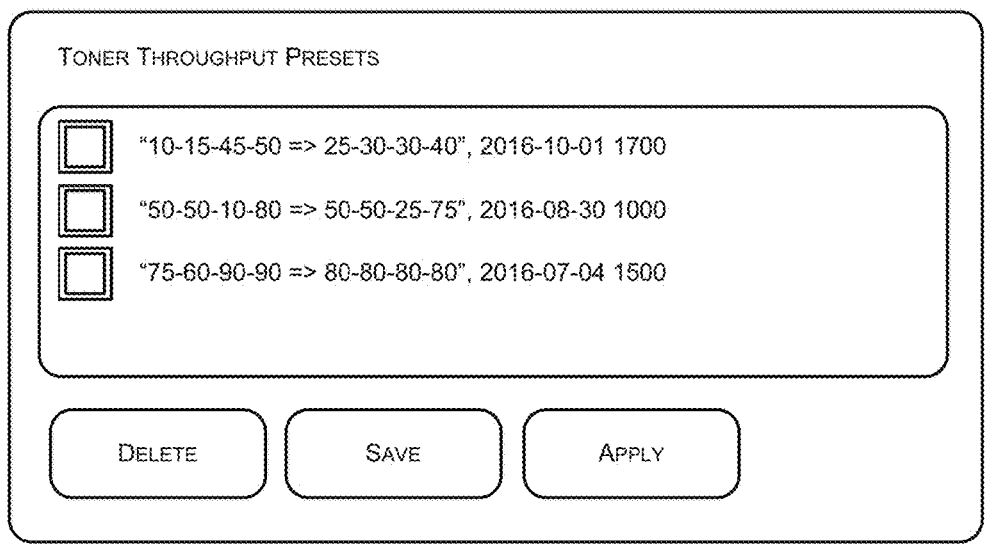
FIG. 6 illustrates an exemplary screenshot of stored Preset Toner Saver Configurations in accordance with embodiments of the present disclosure.

FIG. 6 illustrates an exemplary screenshot of stored Preset Toner Saver Configurations/Toner Throughput Presets/Toner Saver Presets/Presets in accordance with embodiments of the present disclosure. As stated earlier, the Presets may be factory set/preinstalled in TSF 410, or can be user configured as explained against FIG. 5, and saved in TSF 410. In an exemplary implementation, as shown in FIG. 6, syntax for stored Presets can be (Toner Level Values)→(Toner Saver Feature Reduction Configuration), Timestamp.

In an exemplary implementation, the second row of the exemplary screenshot of user interface has an entry of "50, 50, 10, 80→50-50-25-75", 2016 Aug. 30 1000. This indicates that when the toner level goes down to 50%, 50%, 10% and 80% for Cyan, Magenta, Yellow and Black, respectively, then, the TSF 410 will reduce the TTR for the corresponding toner cartridges by 50%, 50%, 25%, and 75%, respectively. This would thereby reduce the throughput for each toner cartridge. Thus, set of figures on the left side is threshold toner levels for different toners and the second set on right side is the amount of reduction for the toner throughput that comes out of each toner.

In an exemplary implementation, the timestamp is a data that can be used by the user to sort and/or identify the Presets in the list. Other identifying data can be added when the Presets are defined, such as username of the one that created, a link to location of saved preset, and so on. This column can also be optional and not be displayed, depending on usage and purposes for the printing device.

As per common practice in the related art, most of the existing printers and MFPs have factory-set default Toner Throughput Rates. According to such factory-set default throughput rates, the throughput rate of any toner would normally be at some factory-set rate, and it can be 90% (of factory set TTR) for normal printing mode and a reduced rate for draft mode. The TTR for draft mode could be 65% resulting in lower quality printouts. However, implementation of the TSF 410 according to the present disclosure can result in the above TTRs that are set in the factory, whether 90% for normal printing mode, or 65% for draft mode, to be further reduced by a factor/percentage that is specified in the selected Toner Saver Feature Preset or Toner Saver Preset or Preset Toner Saver Configuration/Preset. Thus, depending on the current printing mode, whether draft or normal, the toner throughput rate would be reduced by 50%, 50%, 25% and 75% for Cyan, Magenta, Yellow and Black toner cartridges, respectively.

In an exemplary implementation, for a preset of "(50, 50, 10, 80)→(50-50-25-75), 2016 Aug. 30 1000", when the toner levels for CMYK cartridges fall down to 50%, 50% 10% and 80% respectively, the 50%-50%-25%-75% Toner Saver Feature configuration selection would be applied. The formula for calculating the effective toner throughput rate would be:

New Toner Throughput Rate(New_TTR)=(Current TTR−(Current TTR×Selected_reduction_rate)

Thus, in high quality print mode, which normally outputs at 100% Toner Throughput Rate for each colorant, implementation of "50-50-25-75" Toner Throughput Reduction rates, shall result in reduction of Toner Throughput Rates for different cartridges as under:

| | |
|---|---|
| 100%−(100%×50%)=100%−50%=50% | New_TTR for Cyan: |
| 100%−(100%×50%)=100%−50%=50% | New_TTR for Magenta: |
| 100%−(100%×25%)=100%−25%=75% | New_TTR for Yellow: |
| 100%−(100%×75%)=100%−75%=25% | New_TTR for Black: |

In another exemplary implementation, in normal printing mode, which normally outputs at 90% Toner Throughput Rate for each colorant, implementation of "50-50-25-75" Toner Throughput Reduction rates shall result in reduction of Toner Throughput Rates for different cartridges as under:

| | |
|---|---|
| 90%−(90%×50%)=90%−45%=45.0% | New_TTR for Cyan: |
| 90%−(90%×50%)=90%−45%=45.0% | New_TTR for Magenta: |
| 90%−(90%×25%)=90%−22.5%=67.5% | New_TTR for Yellow: |
| 90%−(90%×75%)=90%−67.5%=22.5% | New_TTR for Black: |

In yet another exemplary implementation, in draft mode, which normally outputs at 65% Toner Throughput Rate for each colorant, implementation of "50-50-25-75" Toner Throughput Reduction rates shall result in reduction of Toner Throughput Rates for different cartridges as under:

| | |
|---|---|
| 65%−(65%×50%)=65%−32.5%=32.50% | New_TTR for Cyan: |
| 65%−(65%×50%)=65%−32.5%=32.50% | New_TTR for Magenta: |
| 65%−(65%×25%)=65%−16.25%=48.75% | New_TTR for Yellow: |
| 65%−(65%×75%)=65%−48.75%=16.25%. | New_TTR for Black: |

It is to be appreciated that Toner Saver Feature configuration of "50-50-25-75" used in above calculations for new Toner Throughput Rates is just an example for illustration. There could be a set of any other figures to meet the desired goal of this invention is to be able to reduce Toner Throughput Rate to a certain degree so as to conserve toners and extend life of toner cartridges. For example there can be a different set such as "(50, 50, 10, 80)→(5-5-15-10)" that will lead to better printout quality even with implementation of Toner Saver Feature. With experience gained in operating the Toner Saver Feature, the desired Toner Throughput Reduction rates on the right-hand side will improve. With experience, the rules can be more and more fine-tuned to obtain satisfactory printout quality.

In another embodiment, it may happen that the new TTR becomes so low that it produces very light colorant. In such a case, a revised formula may be employed:

New_TTR=Current_TTR−(Current_TTR×Selected_reduction_rate)

However, if (New_TTR<5%); New_TTR=5%.

As can be seen the above formula shall ensure that Toner Throughput Rate is at least 5%.

It would be appreciated that reduction in Toner Throughput Rate can be implemented in different ways for normal printing mode, draft mode or other printing modes. It can be through color management in printer firmware, through hardware toner management in toner cartridges or in the print head, or some other combinations of software and/or hardware components, and all such implementations are well within the scope of the present disclosure without any limitation whatsoever.

In an embodiment, the TSF 410 according to the present disclosure applies the toner Throughput Rate Reductions on the effective toner throughput rates, regardless of how toner throughput is achieved and implemented in printers and/or MFPs. In an exemplary implementation, if toner throughput is achieved through some software modules in the printer firmware, then, the Toner Throughput Rates would be calculated, applied and performed in software as well.

In an embodiment, TTR reduction can further be applied in toner cartridges, through an update in the print head and/or toner cartridge integrated chips. In an exemplary implementation, the toner Throughput Rate Reduction can be performed in various components in printing device such as, but may not be only limited to, toner cartridge integrated chip, print head integrated chip or housing, firmware/software color management component, firmware/software color conversion component, and firmware/software PDL Interpretation module.

In an embodiment, the TSF 410 can be enabled to always manage the throughput of toners to try to extend their usability or life. In an example implementation, the TSF 410 can be done in two modes i.e. a manual mode and an automatic mode. The manual mode gives administrators or users the capability to explicitly specify how toner cartridges will be used for printing. The automatic mode enables the printer or the MFP engine to perform the TSF 410 programmatically based on criteria or toner status. In an embodiment, the modes will be additional user interface features that are selectable. Users can set the preference between the manual mode and the automatic mode through user interface as shown in FIG. 7.

Figure 7:
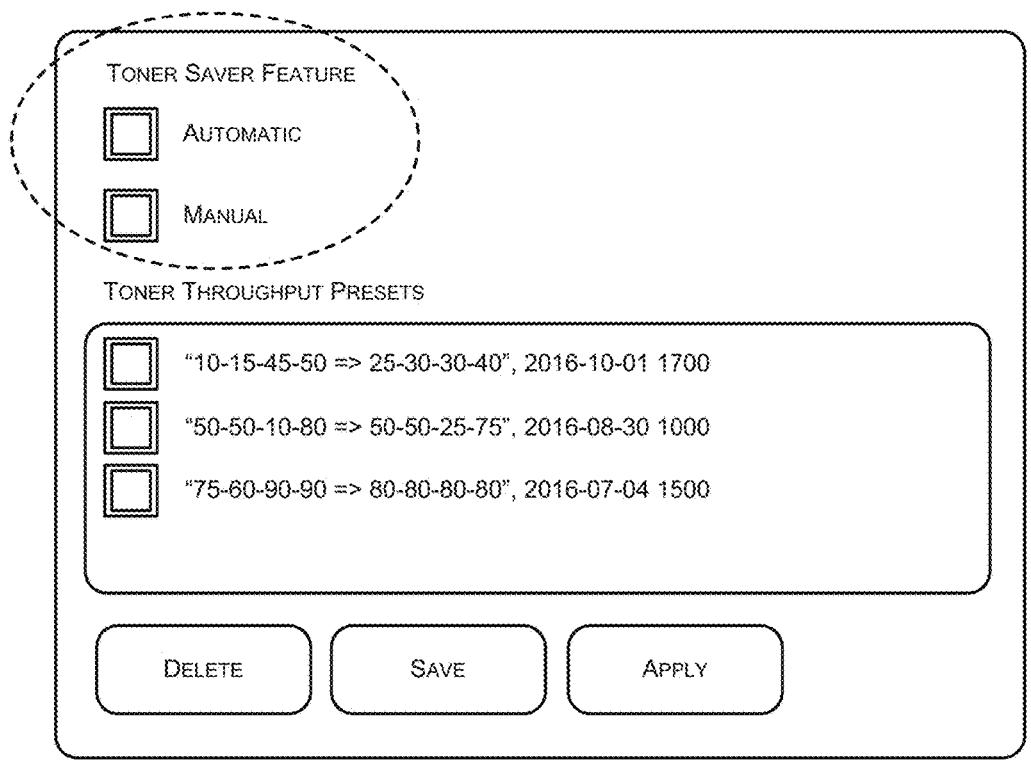
FIG. 7 illustrates an exemplary screenshot of user interface that incorporates feature to exercise option between manual and automatic modes in addition to stored Preset Toner Saver Configurations in accordance with embodiments of the present disclosure.

FIG. 7 illustrates an exemplary screenshot of user interface that incorporates feature to exercise option between manual and automatic modes in addition to stored Presets for enabling advanced features of TSF 410 in accordance with embodiments of the present disclosure. In an example embodiment, the user interface as shown in FIG. 7 is presented as part of a MFP front panel interface update. Because MFPs and printers can have other means for configuring them, these user interface updates to support TSF 410 can also be added and integrated to those other means. It would be appreciated that, examples of ways that an MFP or printer may be configured can include a web service, a mobile app, a desktop app, printer driver user interface, or sending print jobs that contain commands that would set up the TSF. Such applications and methods may send to the TSF 410 of the MFP or printer user-defined configurations and preferences.

In an embodiment, after selection of manual mode, user or administrator can select a Preset listed and visible in user interface to define the toner throughput rate that he wishes to apply for printing. The selected Preset which defines a set of TTR reduction for different toners can get applied irrespective of their current level on pressing 'Apply' button. This allows for customized toner throughput to fine tune toner cartridge output for printouts. This may also help achieve subtle effects of each toner that is not previously available using just regular draft mode, fast draft mode, EcoPrint, normal or high quality printouts. In an example implementation, in manual mode, if a user selects only one Preset then only one Preset gets applied.

In an embodiment, in automatic mode implementation of a Preset can be based on levels of the plurality of colorants as compared to set of threshold levels for each of the respective plurality of colorants that is stored within the selected Preset (refer to description against FIG. 6). TSF 410 may be further configured to enable a comparison between the current levels of different toners with respect to corresponding threshold level stored within the selected Preset and decide to apply corresponding set of Throughput Rate Reductions stored within the selected Preset.

In an embodiment, TSF 410 may enable selection of more than one Presets in manual mode, in which case a combination of manual mode and automatic mode can get activated. In an example implementation, the automatic mode can be auto-selected on selection of more than one Preset, and The TSF 410 shall automatically switch from selected Preset to other as the detected levels of the plurality of colorants undergo change with usage and cross the set of threshold levels.

As would be evident to those skilled in the art, it is possible to have any number of Presets selection in manual mode but it may not have any practical use as to use several Presets in manual mode will function similar to automatic mode. Therefore, in an exemplary implementation, TSF 410 can be configured to support maximum of a pre-determined number of Presets that can be selected in manual mode. As an example, there can be up to five Presets that can be selected in manual mode. In other words, the user cannot select or check more than five Presets, all of which are without conflicts in the toner levels and/or rules. In an embodiment, to differentiate with automatic mode, automatic mode may use all non-conflicting Presets that are defined or in use for this feature.

In an exemplary implementation, the five Presets example here is a threshold. An example of a way to allow selection of Presets by default can be to allow selection of Presets whose toner levels are not too close to one another so that the performance of the system will be optimum and practical. For example, the system may allow selecting up to five Presets where the toner levels are in increments of 5% or 10% or 15%. It would be appreciated that it is possible to work out other formulas or methods to determine the number of Presets and applying them in manual mode can be developed and added in the disclosed system.

In an embodiment, the Presets for automatic mode can be combination of factory set pre-defined Presets, Presets defined and enabled by administrators and user defined Presets. The examples of the Presets are as those discussed above. In an exemplary implementation, as users and administrators gets more experienced on the effects of this new toner saver feature, they will be able to identify which combinations of toner throughput is effective to use based on the toner usage in the workplace. Those that they save as new toner saver configuration Presets can be added to default Presets that can be shared and made available for other printers or MFPs in the office.

In an exemplary implementation, in automatic mode, as toner levels reach threshold levels specified in each Preset, the corresponding TTR reduction values to adjust the toner throughput will be automatically applied. In an exemplary implementation, the Presets in the example user interface as shown in FIG. 7 have checkboxes for each configuration. Only those that are selected or checked will be applied in the automatic mode.

In an embodiment, it is possible to auto-switch from one Preset to another Preset, particularly in automatic mode. The activation of such combination of TSF 410 Presets can benefit a workplace, business, or individuals when the Presets are shared or applied in all printers. In an exemplary implementation, to realize that, the Presets could be installed in a shared location, such as network shared storage, cloud service, or print server. Printers or MFPs can query and retrieve the Presets at boot-up time or at some time-interval or at user's selection at the user interface. Those Presets retrieved from the shared location can get added and activated on the user interface that the MFP or printer will use for performing the TSF. In an exemplary implementation, the Presets can also be saved in USB dongle for portability, easy access and easy application on compatible printing devices, whether on-site or off-site.

In an embodiment, users may not be familiar or may lack the knowledge or experience to be able to define and create practical, useful, and optimum Toner Throughput Presets. In an exemplary implementation, by default, the factory Presets may be shown and made available to user for selection, whether through the user interface in printer driver, or in the front panel, or in standalone applications. Thus, the user will not need to create new Presets if the factories set Presets satisfy the need to conserve the toner cartridges.

In an embodiment, as user and/or administrators can define or create Presets, there's potential for conflicts in toner levels and in the created Presets. When such conflicts are determined or detected during the performing of the manual mode and/or automatic mode, certain Presets may be ignored or skipped. In an exemplary implementation, an extra checking step would be ideally performed during the process of defining of the Presets, wherein the extra step of checking can be done before a Preset is added to the list that is presented in the user interface and before it is saved for re-use.

Figure 8:
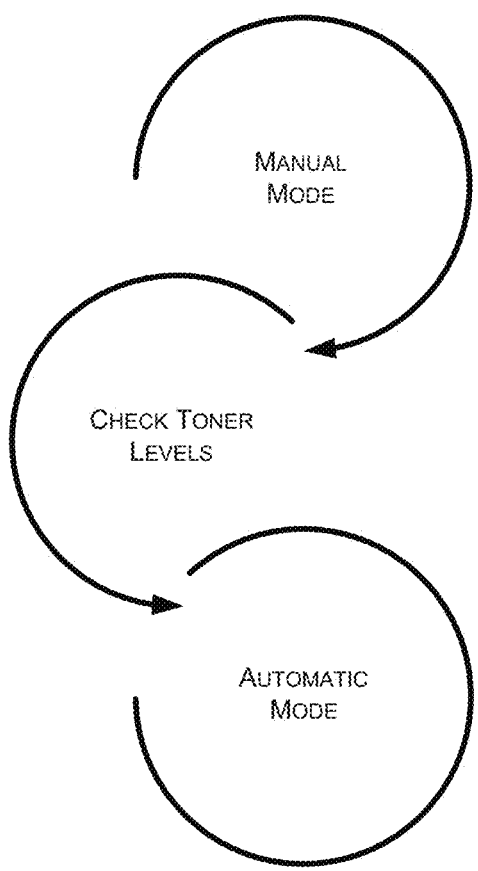
FIG. 8 illustrates an exemplary mixed mode of TSF in accordance with embodiments of the present disclosure.

In an embodiment, combination of manual mode and automatic mode of the disclosed TSF 410 can work together in a different manner wherein TSF 410 automatically switches from manual mode to automatic mode based on user/administrator/site preferences and can happen even when user/administrator has selected only one Preset. FIG. 8 illustrates an exemplary mixed mode functioning of the disclosed TSF 410 in accordance with embodiments of the present disclosure. As shown in FIG. 8, the system of TSF 410 can start initially in manual mode using of user-pre-defined Presets, if there is any, in addition to factory-defined Presets. The manual mode can continue to be in effect for as long as the next stage does not switch to the automatic mode.

In an exemplary implementation, the system of TSF 410 can continuously or periodically checks the toner levels. When it determines that the toner levels of one or more toner cartridges are in critically low levels, such that manual Presets will not be practical to be applied, or that they will not give optimum results as can be determined through experience in using the system, then the TSF 410 can switch the mode to automatic mode which can implement a factory-defined Preset. In an implementation example, the critical low levels can be fixed at 10% or 5% for any or combination of toner cartridges.

In an exemplary implementation, the system of TSF 410 will switch into this Automatic Mode when the toner levels of at least one toner cartridge are at the pre-determined critically low levels, whether 5% or 10% toner levels. This will add assurance or guarantee of optimum results and reduce risk of miscalculations that can result on the use of user-defined Presets, which may not be based on experience and may have estimation errors.

Figure 9:
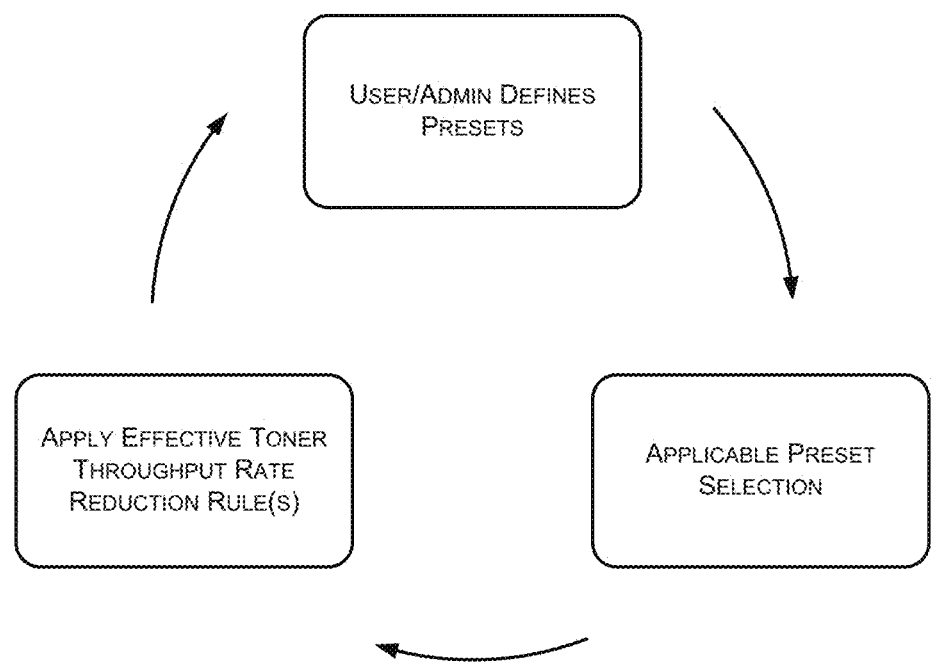
FIG. 9 illustrates an exemplary processing workflow of TSF in accordance with embodiments of the present disclosure.

In an embodiment, the toner throughput rate to be applied on the toner cartridges is determined through one or more Presets selected by the user and/or administrator. The system will determine if there is a single preset or multiple Presets. In automatic mode, the system will check the toner levels, compare with respective threshold values as specified in the Preset(s), and switch to the applicable Preset to implement set of throughput rate reduction values in accordance with the Preset. FIG. 9 illustrates an exemplary processing workflow of TSF 410 in accordance with embodiments of the present disclosure.

In an exemplary implementation, the user, system administrator or other personnel interacts with the user interface and the system to create and define Presets. This step can be performed in a standalone application, whether in mobile device, tablet, smartphone, laptop, computer or other computing devices, or in the printer driver, or in a web service for managing the printer, or on the printer front panel. The Presets can be saved in any storage medium, for re-use. If it's in a USB dongle, the Presets can be carried around by a user/admin and applied as needed on compatible printing devices.

In an exemplary implementation, the system will check the selected Presets to see if the specified toner levels match the actual toner levels in the toner cartridges. The Preset whose specified toner levels matches with present/actual level will be selected and fed to the system for implementation of the associated toner Throughput Rate Reductions.

In an exemplary implementation, given the selected and corresponding toner Throughput Rate Reductions, the system will communicate and coordinate with the toner cartridge system to actually enforce the reduction values. As a result, toner or ink material will be conserved to extend life of the toner cartridges.

In an embodiment, with the capability of the present invention to estimate when the toner levels of toner cartridges will become low, it is possible to use the calculated estimation as a way to determine when toner cartridges will become empty (that is, determine number of days or weeks or months) and thereby be able to give notifications and/or alerts to personnel for the advance ordering of new or replacement toner cartridges. Systems that perform pre-ordering of replacement toner cartridges can use the data from this toner saver system to coordinate the pre-ordering of the replacement toner cartridges. This way, a day or two or a few days may be saved to lessen the risk of delivery delays for replacement toner cartridges. Ordering and deliveries can be better planned ahead around holidays, events, and unexpected scheduling factors.

Figure 10:
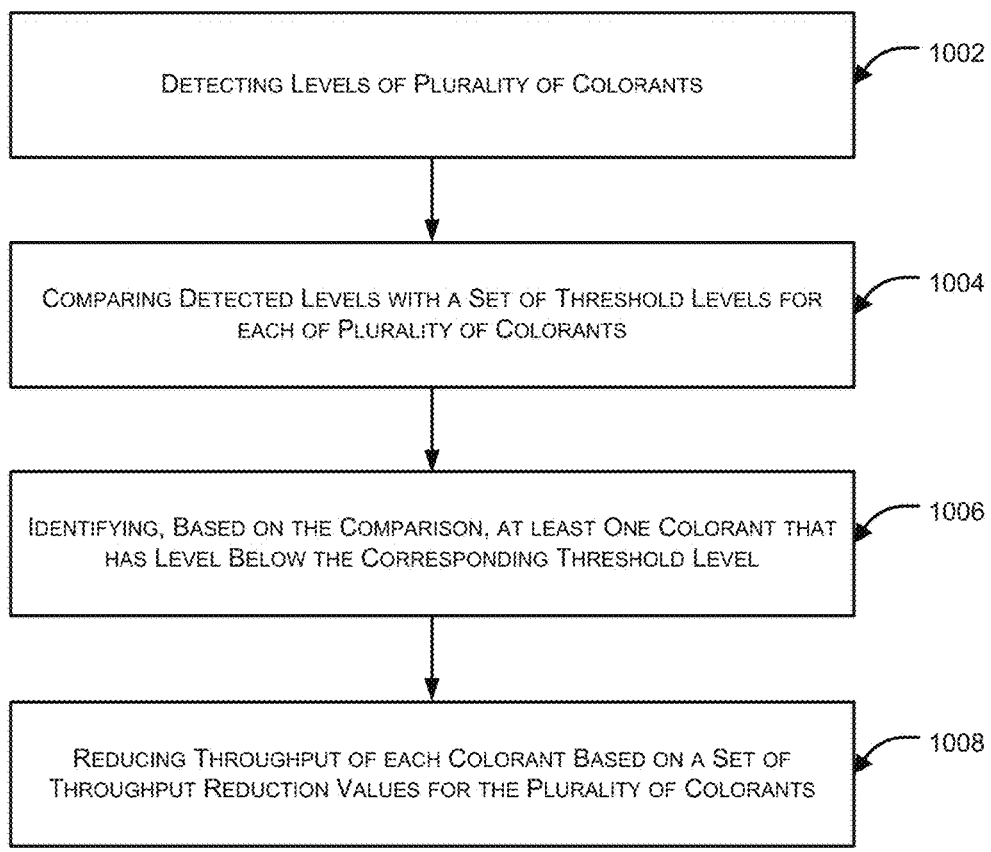
FIG. 10 illustrates an exemplary flow diagram for the proposed method for regulating the usage of toners or ink cartridges while printing in accordance with an embodiment of the present disclosure.

FIG. 10 illustrates an exemplary method flow diagram the proposed method for saving a plurality of toners or ink with a view to extend life of cartridges while printing in accordance with an embodiment of the present disclosure. This example process is merely illustrative, and therefore other processes may be substituted as would be understood by those skilled in the art. Further, the disclosed method may be modified, by adding, deleting or modifying operations, without departing from the scope of the inventive concept.

The disclosed method for saving a plurality of colorants such as Toners or inks to extend usable life of toner/ink cartridges in a printing device can comprise steps such as step 1002 of detecting levels of the plurality of toners. The levels of the plurality of toners can be detected continuously or intermittently at predefined fixed intervals. At step 1004 the detected levels of the plurality of toners can be compared with a set of threshold levels for each of the respective plurality of toners, wherein the set of threshold levels for the plurality of toners is contained within at least one Preset Toner Saver Configuration. At step 1006, on detecting, based on the comparison, that one or more toners have level less than the corresponding threshold values, at step 1008 throughput of each of the plurality of toners can be reduced, wherein the throughput for each of the plurality of toners is reduced in accordance with a set of throughput rate reduction values for each of the plurality of toners that is contained within the at least one Preset Toner Saver Configuration.

In an embodiment, there can be plurality of Preset Toner Saver Configurations and the disclosed method can further include step of selecting one or more of the plurality of Preset Toner Saver Configurations for implementation, and wherein there can be an additional step of determining if user has selected a single or multiple Preset Toner Saver Configurations.

In an embodiment, on there being more than one selected Preset Toner Saver Configurations the method can further include step of determining the Preset Toner Saver Configuration out of the selected Preset Toner Saver Configurations that is to be implemented. In an embodiment, determination of one Preset Toner Saver Configuration out of the selected Preset Toner Saver Configurations for implementation can be based on detected toner levels and set of threshold toner level values in the respective Preset Toner Saver Configurations In an exemplary implementation, at least one preference selected from a plurality of preferences for throughput adjustment while printing can be displayed on the user interface. The plurality of preferences may be obtained by storing the throughput adjusted while printing in history. In another exemplary implementation, an effect on a potential printout attributable to adjusting the throughput may also be displayed on the user interface.

In an exemplary implementation, the manual selection for the throughput may be stored in the non-transitory storage device for future printings. In another exemplary implementation, the user may select one or more pre-stored selections for the throughput applied historically. In another exemplary implementation, the pre-stored selection for the throughput may be deleted by the user.

Figure 11:
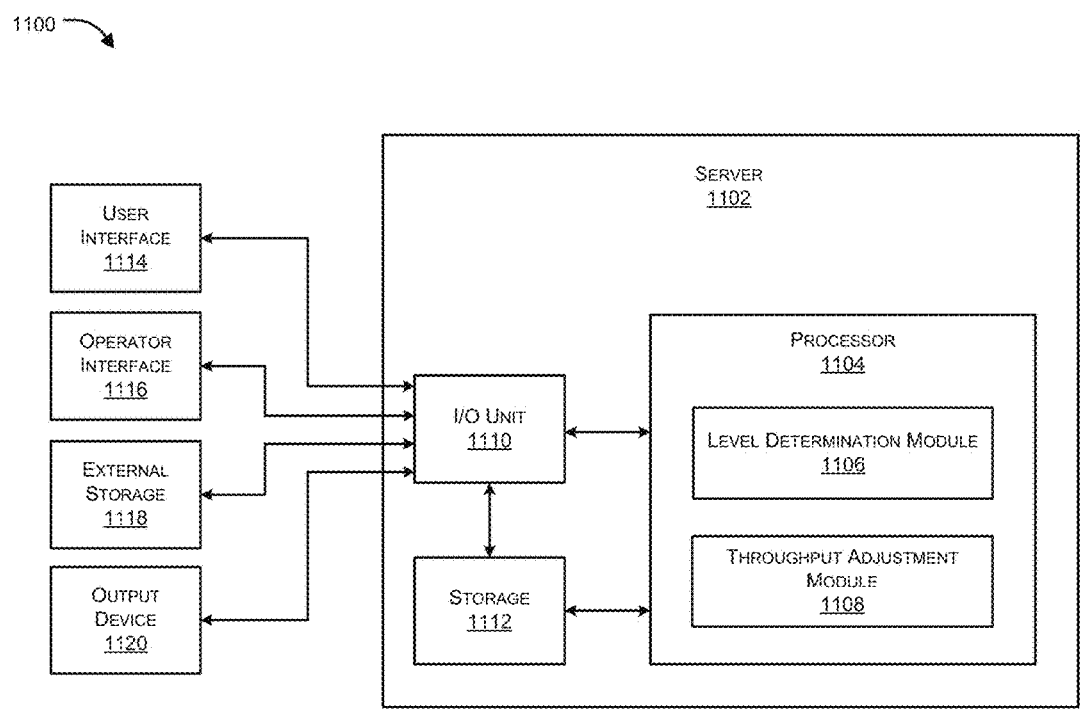
FIG. 11 illustrates an exemplary device system for implementation of the disclosed TSF in accordance with an embodiment of the present disclosure.

FIG. 11 illustrates an exemplary device system for implementation of the disclosed TSF in accordance with an embodiment of the present disclosure. This exemplary system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, system 1100 can include a server 1102 that may involve an I/O unit 1110, storage 1112, and a processor 1104 operable to execute one or more units as known to one skilled in the art. The term "computer-readable medium" as used herein refers to any medium that participates in providing instructions to processor 1104 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1114 and operator interfaces 1116 which may utilize input devices such as a keyboard, mouse, touch device, or verbal command The server 1102 may also be connected to an external storage 1118, which can contain removable storage such as a portable hard drive, optical media (CD or DVD), disk media or any other medium from which a computer can read executable code. The server may also be connected an output device 1120, such as a display to output data and other information to a user, as well as request additional information from a user. The connections from the server 1102 to the user interface 1114, the operator interface 1116, the external storage 1118, and the output device 1120 may via wireless protocols, such as the 802.11 standards, Bluetooth® or cellular protocols, or via physical transmission media, such as cables or fiber optics. The output device 1120 may therefore further act as an input device for interacting with a user.

The processor 1104 can include a level determination module 1106 and a throughput adjustment module 1108. The level determination module 1006 determines toner levels associated with one or more toner cartridges utilized while printing. The throughput adjustment module 1008 adjusts a throughput associated with one or more toner cartridges utilized while printing, wherein the throughput is adjusted automatically and/or manually based on the toner levels determined.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A printing device incorporating a colorant saver feature for saving a plurality of colorants to extend usable life of colorant cartridges in the printing device, wherein the colorant saver feature is configured to:
   detect levels of the plurality of colorants;
   compare the detected levels of the plurality of colorants with a set of threshold levels for each of the respective plurality of colorants, wherein the set of threshold levels for the plurality of colorants is contained within at least one preset colorant saver configuration;
   identify, based on the comparison, at least one colorant out of the plurality of colorants that has level below the corresponding threshold level;
   reduce, on detection that at least one colorant has level below the corresponding threshold level, throughput of each of the plurality of colorants in accordance with a set of throughput rate reduction values for each of the plurality of colorants, wherein the set of throughput rate reduction values for each of the plurality of colorants is contained within the at least one preset colorant saver configuration;

wherein the at least one preset colorant saver configuration is user configurable.

2. The printing device as claimed in claim 1, wherein the colorant saver feature enables a user to change the set of throughput rate reduction values for each of the plurality of colorants individually through a user interface, and wherein the changed set of throughput rate reduction values get saved as one of the at least one preset colorant saver configuration with a time stamp for future use.

3. The printing device as claimed in claim 2, wherein the user interface further provides a preview of potential printout to provide a visual guidance to the user.

4. The printing device as claimed in claim 2, wherein the user interface further allows the user to change the set of threshold levels for each of the plurality of colorants.

5. The printing device as claimed in claim 1, wherein the at least one preset colorant saver configuration is factory set.

6. The printing device as claimed in claim 1, wherein the set of throughput rate reduction values gets implemented in all modes of printing selected from normal print mode, high quality print mode, draft mode, or fast draft mode that changes the throughput for the plurality of colorants; wherein factory set throughput rates for said all modes of printing get further reduced proportionately based on set of throughput rate reduction values contained in the selected at least one preset colorant saver configuration.

7. The printing device as claimed in claim 1, wherein the at least one preset colorant saver configuration gets implemented in automatic mode or manual mode, and wherein option for the automatic mode and the manual mode is user selectable.

8. The printing device as claimed in claim 7, wherein in the manual mode, on the user selecting any one of the at least one preset colorant saver configuration, the corresponding set of throughput rate reduction values get implemented irrespective of levels of the plurality of colorants.

9. The device as claimed in claim 8, wherein the at least one preset colorant saver configuration gets implemented in combination of the user selection and automatic implementation; wherein the user selection is for more than one of the at least one preset colorant saver configuration and the automatic implementation switches from one of the user selected at least one preset colorant saver configuration to other at least one preset colorant saver configuration as the detected levels of the plurality of colorants undergo change with usage and cross the set of threshold levels.

10. The device as claimed in claim 1, wherein the colorant saver feature is configured by sending the at least one preset colorant saver configuration to the device through at least one of or a combination of a web service, a mobile app, a desktop app, printer driver user interface; or by a dongle; or by sending print jobs that contain commands that would set up the at least one preset colorant saver configuration.

11. A method for saving a plurality of colorants to extend usable life of colorant cartridges in a printing device, the method comprising steps of:

detecting levels of the plurality of colorants;

comparing the detected levels of the plurality of colorants with a set of threshold levels for each of the respective plurality of colorants, wherein the set of threshold levels for the plurality of colorants is contained within at least one preset colorant saver configuration;

identifying, based on the comparison, at least one colorant out of the plurality of colorants that has level below the corresponding threshold level;

reducing, on detection that at least one colorant has level below the corresponding threshold level, throughput of each of the plurality of colorants, wherein the throughput for each of the plurality of colorants is reduced in accordance with a set of throughput rate reduction values for each of the plurality of colorants, wherein the set of throughput rate reduction values is contained within the at least one preset colorant saver configuration.

12. The method as claimed in claim 11, wherein the at least one preset colorant saver configuration gets implemented in automatic mode or manual mode, and wherein option for the automatic mode and the manual mode is user selectable.

13. The method as claimed in claim 12, wherein in the manual mode, the at least one preset colorant saver configuration gets implemented based on manual selection, wherein on a user selecting one of the at least one preset colorant saver configuration, the corresponding set of throughput rate reduction values gets implemented irrespective of the levels of the plurality of colorants.

14. The method as claimed in claim 13, wherein the at least one preset colorant saver configuration gets implemented in combination of the user selection and the automatic implementation; wherein the user selection is for more than one of the at least one preset colorant saver configuration and the automatic implementation switches from one of the user selected at least one preset colorant saver configuration to other at least one preset colorant saver configuration as the detected levels of the plurality of colorants undergo change with usage and cross the set of threshold levels.

15. The method as claimed in claim 11, wherein the set of throughput rate reduction values gets implemented in all modes of printing selected from normal print mode, high quality print mode, draft mode, or fast draft mode that changes the throughput for the plurality of colorants; wherein factory set throughput rates for said all modes of printing get further reduced proportionately based on set of throughput rate reduction values contained in the selected at least one preset colorant saver configuration.

16. The method as claimed in claim 11, wherein the at least one preset colorant saver configuration is factory set.

17. The method as claimed in claim 11, wherein the at least one preset colorant saver configuration is configurable by a user.

18. The method as claimed in claim 17, wherein the at least one preset colorant saver configuration is configured by the user using a user interface that allows the user to individually change throughput values and threshold values of each of the plurality of colorants.

19. The method as claimed in claim 18, wherein the user interface for configuring the at least one preset colorant saver configuration further displays a preview of quality of print with changed throughput values.

20. The method as claimed in claim 11, wherein the at least one preset colorant saver configuration is sent to the printing device through at least one of or a combination of a web service, a mobile app, a desktop app, printer driver user interface; or by a dongle; or by sending print jobs that contain commands that would set up the at least one preset colorant saver configuration.

* * * * *